United States Patent Office 3,221,738
Patented Dec. 7, 1965

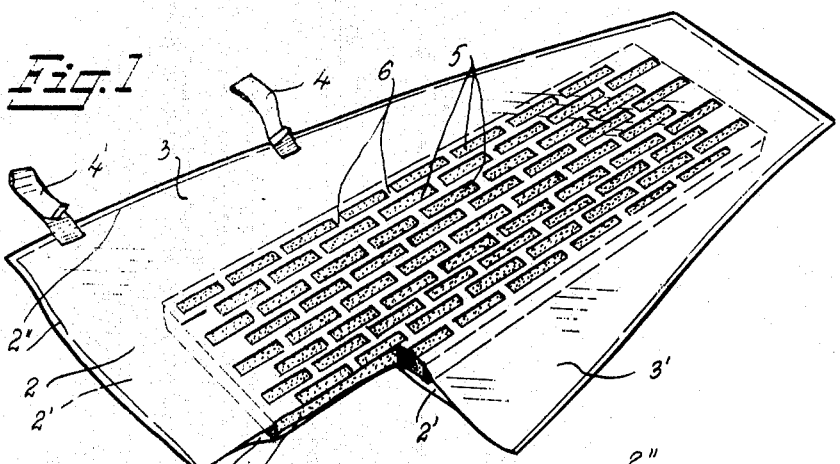
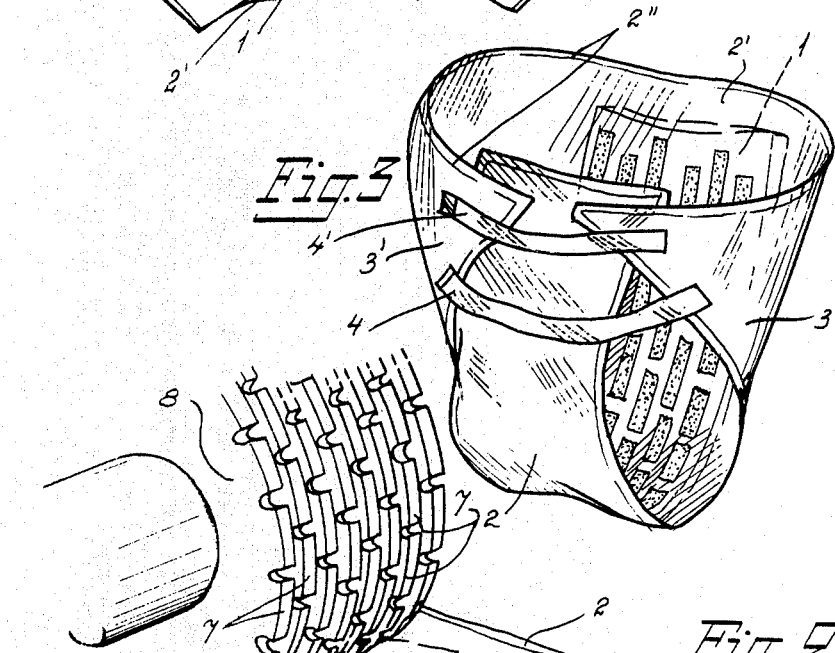
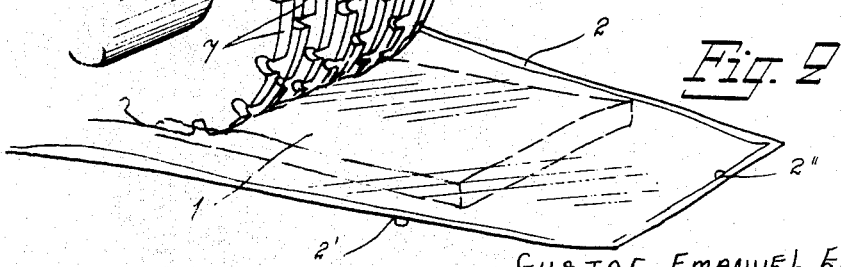

3,221,738
METHOD FOR MANUFACTURING DIAPERS AND THE LIKE, AND A DIAPER MANUFACTURED IN ACCORDANCE WITH THIS METHOD
Gustaf E. Ekberg, Boxholm, Sweden, and Tord David Green, Kopmangatan 1, Vasteras, Sweden
Filed Apr. 1, 1963, Ser. No. 269,612
Claims priority, application Sweden, Apr. 5, 1962, 3,803/62
3 Claims. (Cl. 128—287)

This invention relates to a method for manufacturing diapers and the like, as well as to a diaper manufactured according to this method.

A demand for an efficient and inexpensive diaper intended to be used once only, and which is usable without so-called diaper trousers, has been known for a long time.

After a short time of use the material of the diaper trousers becomes rather hard and chafes the child's body. Besides, it is impossible to obtain so tight a contact between the diaper trousers and the body as would be necessary to prevent liquid from passing the confining edges of the diaper trousers, and thus liquid will impurify clothing and bed-linen.

The above-mentioned demand is filled extraordinarily well by means of the diaper manufacturing method according to the invention and the diaper manufactured by this method.

The main feature of the method according to the invention consists in placing a core of moisture-absorbing material between the two layers of liquid-insulating, thin plastic foil, interconnecting these foil layers by welding or glueing around all confining edges of the core so that the core is completely enclosed in the foil layers, and then heating one of the foil layers inside the confining edges of the core entirely or partially to such a temperature that the liquid-insulating property of the foil is neutralized, whereby the liquid reaching the surface of the heat-treated foil will be sucked in automatically by the core.

A further feature of the method is that the foil layer is heated by means of a number of heated metal bodies located at a short distance from each other so that the foil layer forms a net-like pattern of liquid-insulating foil.

The diaper according to the invention consists of a core of moisture-absorbing material, which is completely enclosed by a liquid-insulating, thin plastic foil, and its main feature is that the plastic foil on one of the core sides inside its confining edges is heat-treated in such a way that the liquid-insulating property of the foil is completely or partially neutralized, so that liquid reaching the heat-treated foil surface is automatically sucked in through the foil and absorbed by the core.

The diaper is further characterized in that the foil layer is heated by means of a number of heated metal bodies placed at a short distance from each other, so that the foil layer forms a net-like pattern of liquid-insulating foil.

The method as well as an embodiment of the diaper according to the invention are described in detail below, reference being made to the accompanying drawing, in which:

FIG. 1 is a perspective view of the diaper, partly sectionized,

FIG. 2 is a perspective view of the diaper and a device for carrying out the heat treatment, FIG. 3 is a perspective view of the diaper as in use.

Referring now to the drawing, the numeral 1 designates the core consisting of moisture-absorbing material, such as cellulose or the like. The numeral 2 indicates one of the plastic foil layers (the one intended to contact the child's body), and 2' indicates the other plastic foil layer.

The core 1 is placed between these two layers 2, 2', and the two layers 2, 2' are connected around their marginal edges by welded seams 2". At two opposite confining edges of the core 1 the foil layers 2, 2' are shaped into triangular flaps 3 and 3', to which fixing means 4 and 4', suitably adhesive strips, can be fastened to hold the diaper around the child's body.

On one (the inner) foil layer 2 a number of rectangular surfaces 5 inside the confining edges of the core 1 are heat-treated, between which surfaces 5 there is formed a net 6 of not heat-treated surfaces. The heat treatment is carried out by bringing the foil layer 2 into contact with a number of heated, cog-like metal bodies 7, which are shaped in or provided on a rotary wheel 8, a drum or the like. The heat radiating surfaces of the metal bodies are suitably rectangular of shape.

The heat treatment alters the properties of the foil 2 so that it is no longer water-tight, i.e. a very great number of throughgoing pores is formed, through which liquid can pass. Since the core 1 is very moisture-absorbing, all liquid reaching the heat-treated checkers or surfaces is rapidly sucked up. As the foil layer is not moisture-absorbing even after heat treatment, the surface of the foil layer in contact with the child's body will dry up quickly. Air can pass through the pores, and thus the foil 2 will not adhere to the child's body. The net-like pattern 6 consisting of non-heat-treated foil serves to maintain the elasticity and strength of the foil layer. Through the heat treatment, furthermore, the core 1 is adhered to the foil layer 2 and is thus fixed in its position.

The heat treatment can also be carried out in other ways than mentioned above, for instance by exposing the foil to hot air jets. Furthermore, the heat treatment can be carried out before the foil layer 2 has been placed over the core 1 and before the core is entirely enclosed by the foil 2, 2', which may consist of a hose, in which the core 1 is inserted, and which is then closed at both ends by welding or glueing.

As the diaper is intended to be used once only, the flaps 3, 3' are of great importance in facilitating the fastening of the diaper around the child's body, as these flaps can be coated with an adhesive, so that special suspension means can be omitted.

The uncomplicated method of manufacture and the design of the diaper makes it possible to sell the diaper at price that practically equals the price of diapers used with diaper trousers.

The invention is not confined to the method and embodiment described above, as modifications are possible without abandonment of the inventional spirit.

We claim:

1. A diaper or similar protective garment comprising, a pair of relatively thin sheets of thermoplastic material joined together and sealed at their marginal edges to provide a pocket between them, a core of liquid adsorbing material disposed in said pocket between the sheets, one of said sheets being liquid impermeable and adapted to be disposed outwardly from the user, the other of said plastic sheets at least in the area of said core comprising an embossed network of water impermeable plastic material adapted to be disposed inwardly toward the user, said network being defined by a plurality of spaced apart areas in the plastic sheet which are liquid penetrable, each of said spaced apart areas having a plurality of minute perforations distributed throughout said area, said network providing structural strength for said inner sheet while said spaced apart areas pass body liquid therethrough for rapid adsorption in said core.

2. The method of making a diaper or similar protective garment comprising, placing a moisture adsorbent, rough surfaced core between inner and outer layers of relatively thin, liquid impermeable thermoplastic material, sealing the layers together around their marginal edges to confine the core between said layers, pressing hot die surfaces against said inner layer as it rests against said core, and forcing the rough surface of said core into said inner layer overlying said core a sufficient amount to adhere said core and layer and form a relatively large, liquid permeable surface having minute perforations distributed throughout capable of passing body liquid therethrough for rapid adsorption in said core.

3. The method of making a diaper of similar protective garment comprising, placing a moisture adsorbent, rough surfaced core between inner and outer layers of relatively thin, liquid impermeable thermoplastic material, sealing the layers together around their marginal edges to confine the core between said layers, pressing a plurality of spaced apart hot die surfaces against said inner layer as it rests against said core, and forcing the rough surface of said core into said inner layer a sufficient amount to adhere said core and layer, forming a plurality of liquid penetrable areas having minute perforations distributed throughout capable of passing body fluid therethrough for rapid adsorption in said core, and forming a network of liquid impermeable areas providing structural strength for said inner sheet.

References Cited by the Examiner
UNITED STATES PATENTS

| | | | |
|---|---|---|---|
| 2,468,445 | 4/1949 | Hurst | 128—287 |
| 2,970,345 | 2/1961 | Wangner | 117—10 |
| 2,834,347 | 5/1958 | Connally | 128—284 |
| 2,896,626 | 7/1959 | Voightman | 128—287 |
| 2,899,349 | 8/1959 | Jenkins | 156—290 |
| 3,004,895 | 10/1961 | Schwartz | 128—287 |
| 3,012,918 | 12/1961 | Schaar | 156—252 |
| 3,088,843 | 5/1963 | Schaar | 117—10 |
| 3,095,315 | 6/1963 | Magill. | |

RICHARD A. GAUDET, *Primary Examiner.*